(12) United States Patent
Hayosh

(10) Patent No.: US 6,212,504 B1
(45) Date of Patent: Apr. 3, 2001

(54) SELF-AUTHENTICATION OF VALUE DOCUMENTS USING ENCODED INDICES

(75) Inventor: Thomas David Hayosh, Bloomfield Hills, MI (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/226,819

(22) Filed: Jan. 6, 1999

Related U.S. Application Data

(60) Provisional application No. 60/071,154, filed on Jan. 12, 1998.

(51) Int. Cl.$^7$ .................................................... G06F 17/60
(52) U.S. Cl. ............................... 705/64; 705/72; 705/75; 705/76; 235/375; 713/100
(58) Field of Search ........................... 235/375; 713/168, 713/100, 200; 705/64

(56) References Cited

U.S. PATENT DOCUMENTS

| | | | |
|---|---|---|---|
| 4,806,740 | * 2/1989 | Gold et al. | 235/449 |
| 5,371,798 | * 12/1994 | McWhortor | 380/51 |
| 5,475,205 | * 12/1995 | Behm et al. | 235/375 |
| 5,509,692 | * 4/1996 | Oz | 713/168 |
| 5,742,685 | * 4/1998 | Berson et al. | 713/186 |
| 6,003,763 | * 12/1999 | Gallagher et al. | 235/379 |
| 6,030,001 | * 2/2000 | Kruckemeyer | 283/70 |

FOREIGN PATENT DOCUMENTS

| | | | |
|---|---|---|---|
| WO 99/41700 | * 8/1999 | (WO) | G06F/7/10 |
| WO 99/64999 | * 12/1999 | (WO) | |

OTHER PUBLICATIONS

"Photo safety checks", Inc., Oct. 1994, vol. 16, Issue 10, p32, 1/8p.*

DeSilver, Drew, "Microtrace IDs many markets", Minneapolis–St. Paul CityBusiness, May 19, 1995, vol. 12 Issue 50, p1.*

Belsie, Laurent, "Outsmarting counterfeiters with high–tech bills", Christian Science Monitor, Mar. 12, 1996, vol. 88 Issue 73, p13.*

Orman, Neil, "Fighting Check Fraud", Austin Business Journal, Sep. 13, 1996, vol. 16, Issue 30, p27, 2bw.*

Jeffords, R., Thibadoux, G. Scheidt, M., New Technologies to combat check fraud, CPA Journal v69n3 pp. 30–35, Mar. 1999.*

* cited by examiner

*Primary Examiner*—James P. Trammell
*Assistant Examiner*—Chang Y. Chung
(74) *Attorney, Agent, or Firm*—Aldred W. Kozak; Mark T. Starr; Lise A. Rode

(57) ABSTRACT

A method and system as presented by which valuable documents such as checks, deeds, driver's licenses, and other types of valuable documents can be imprinted with encoded symbols by a printer whereupon multiple assemblages of data can be imprinted on the valued document which is then susceptible to readout by a document reader which will automatically authenticate and verify the originator or the document and its authenticity and obviate any attempts for fraudulent alteration.

27 Claims, 10 Drawing Sheets

D:\RSA\Data3.int

```
00000000  0101 556E 6973 7973 0101 2020 3630 3636  ..Unisys.. 6066
00000010  3333 3635 0D0A 3131 2F32 342F 3139 3937  3365..11/24/1997
00000020  0D0A 3030 3030 3030 3732 3833 0D0A 4A6F  ..0000007283..Jo
00000030  686E 2051 2E20 5075 626C 6963 0D0A 4330  hn Q. Public..C0
00000040  3637 3735 4338 4130 3732 3030 3033 3236  6775C8A072000326
00000050  4136 3036 3633 3336 3543 3630 0D0A       A606633365C60
```

FIXED FORMAT DATA
A) DOCUMENT TYPE
B) VERSION NUMBER
C) LICENSEE'S NAME
D) PUBLIC KEY ID NUMBER

PERSONALIZED DATA
A) DATA OF ISSUE
B) AMOUNT OF CHECK
C) PAYEE'S NAME

MICR LINE DATA
A) AUX ON-US DATA
B) EPC CHARACTER
C) RT FIELD DATA
D) ON-US DATA

RECORD LENGTH IS 94 BYTES

FIG. 8

```
D:\RSA\Data3.sig

00000000  AB6B F431 EF23 B88B 5839 CBF5 3DBB 0342  .k.1.*#..X9..=..B
00000010  D0D5 9ABA DCEC FB3F 0CB5 D104 2CF4 6CAF  .......?....,.l.
00000020  1184 11B3 E012 2595 A76F B0C1 518B A6EA  ......%..o..Q...
00000030  4CF7 9439 68CB 2A2A 0715 CE42 2D25 5E2B  L..9h.**...B-%^+
00000040  C7EC 12E2 8802 46A4 4918 5A98 242B 3178  ......F.I.Z.$+1x
00000050  01B5 38BD 46F1 A939 0412 C653 5D24 9493  ..8.F..9...S]$..
```

LENGTH OF RECORD IS 96 BYTES

FIG. 9

D:\RSA\Data3.lab

```
00000000 0101 556E 6973 7973 0101 2020 3630 3636  ..Un isys....6066
00000010 3333 3635 0D0A 3131 2F32 342F 3139 3937  3365..11/24/1997
00000020 0D0A 3030 3030 3030 3732 3833 0D0A 4A6F  ..00000007283..Jo
00000030 686E 2051 2E20 5075 626C 6963 0D0A AB6F  hn Q. Public...k
00000040 F431 EF23 B88B 5839 CBF5 3DBB 0342 0DD5  .1.#..X9..=..B..
00000050 9ABA DCEC FB3F 0CB5 D104 2CF4 6CAF 1184  .....?....,.l...
00000060 11B3 E012 2595 A76F B0C1 518B A6EA 4CF7  ....%..o..Q...L.
00000070 9439 68CB 2A2A 0715 CE42 2D25 5E2B C7BC  .9h.**...B-%^+..
00000080 12C2 8802 4620 4918 5A98 242B 3178 01B5  ....F I.Z.$+1x..
00000090 38BD 46F1 A939 0412 C653 5D24 9493       8.F..9...S]$.
```

END OF CLEAR TEXT DATA AND BEGINNING OF DIGITAL SIGNATURE DATA

END OF DIGITAL SIGNATURE DATA

TYPE AND VERSION #
TYPE 1
VERSION 1

RECORD IS 158 BYTES

FIG. 10

SELF-AUTHENTICATION OF VALUE DOCUMENTS USING ENCODED INDICES

CROSS REFERENCES TO RELATED APPLICATIONS

This application is based upon the U.S. Provisional filing Serial No. 60/071,154 filed Jan. 12, 1998, and claims priority therefrom under 35 USC and 37 CFR 1.78.

This application is related to a co-pending application U.S. Ser. No. 08/951,757 and filed Oct. 16, 1997 under the title of Enhancing for Check Security which application is incorporated herein by reference.

FIELD OF THE INVENTION

This disclosure provides means and methods for self-authentication of value documents which can be produced on and digitally signed by various printing methods or by conventional laser printers.

BACKGROUND OF THE INVENTION

The subject involved herein is about the authentication of the validity of important and valuable documents such as personal checks, commercial checks, traveler checks, credit cards, event tickets, passports, driver's licenses, motor vehicle titles and certain negotiable instruments. There is a great impetus to reduce fraud, that is to say, to prevent counterfeits and forgeries which are often elements of existing fraudulent use of the types of documents listed above. Counterfeit documents can be produced by criminals who copy or scan a legitimate check to extract the bank data, signature data, and account data and then produce checks which, for all practical purposes, look identical to the genuinely issued documents. An altered check or even other types of altered documents may use a genuine check or a genuine document, but where the payee, or the amount of the check that is to be paid, is altered, and presents difficulty of detection. It is also possible that stolen check stock may be utilized in order to forge checks where the payee, the amount and signature is fraudulently imprinted.

In order to provide a higher level of security and to detect fraudulent documents, it is most desirable to provide a machine readable authentication or verification method in order to eliminate the problem of the merchant or the bank teller not being properly trained in the art of document security analysis. Also to counteract the threat of espionage, the machine readable authentication techniques must not rely on the secrecy of certain algorithms, or the wide distribution of secret decryption/encryption keys, or on the access to special inks or compounds which are often used to mark the paper.

Public key encryption, and more specifically, public key digital signatures provide a very high level of security which is not available through the previously known algorithms and the decryption/encryption keys or special inks. Easy access to the machine readable data on a check is made because that data is contained in a 2-D bar-coded symbol in clear text. This is typical of negotiable checks and often used in other valuable documents. However, that particular data (2-D bar-coded symbols in clear text) is highly protected against alteration because that data is used along with the MICR (Magnetic Ink Character Recognition) code line data to produce a digital signature using the private key of the person who owns the particular account or who digitally signed the document.

Successful authentication by use of the certified public key of the account holder insures that not one bit of the data, which is digitally signed, has been altered, as well as that the person who did the digital signing is the person who he says he is.

An additional level of document security, above that of pure digital signature authentication, is provided by the use of a unique or random pattern provided by a taggant which is permanently applied to the document wherein the pattern code is also included in the clear text and then digitally signed along with the other signed data.

Access to the public key may be provided by a trusted third party who acts as the certificate authority and who encrypts each of the public keys using their own private key. The verification process then uses the public key of the certificate authority in order to expose the required public key of the account holder thereby guarding against any fraudulent keys getting to be used.

CORPORATE CHECK PRINTING: The printing and issue of checks by corporations and small businesses is now primarily done with the use of laser printers. These laser printers use any one of the following two methods.

I. The first method uses blank check stock, without any MICR printing in the specific location called the MICR print band. The blank check stock usually contains human visual security features which allow detection of attempted alterations or counterfeiting, although because of the ready availability of basic check stock, the use of it is no guarantee of the validity of the check. MICR provides for bank automation using magnetic ink and utilizes a special font called E-13B. Printing of MICR requires that the laser printer system contain a special font and also a custom magnetic toner cartridge, in order to print checks that comply with the ANSI magnetic signal level requirements for the E-13B characters and symbols. When printing the MICR code line, the entire customized printing of the issued check is printed using MICR ink. The customized printing usually includes the issuing firm's name and its bank logos, in addition to the check serial number, the payee name, the date, the amount in words, the convenience amount (written in numbers) and optionally, the issuing authority's signature. When the signature facsimile is not printed by the laser printer, then the checks must be manually signed.

II. The second method of printing and issuing checks by corporations and small business uses pre-printed MICR check stock. Each check provided by the check printer is serialized, and the MICR code line is completely printed with the required account number and bank codes required for bank processing. Here the checks are provided on sheets in accordance with a specific accounting application to be used. With this method, the laser printer prints the variable information on the check as was done in the first method, but here is using an ordinary laser printer with standard toner. This method cannot print MICR characters because the toner usually does not contain the required magnetic components necessary to meet the magnetic signal level requirements. These type of preprinted checks are usually more expensive than using blank check stock. Additionally, more care is required in keeping the preprinted check stock in a safe place because if stolen, they can easily be used to write fraudulent checks.

SUMMARY OF THE INVENTION

In order to enhance the method and means of authenticating data contained in valuable documents such as checks, deeds, passports, negotiable instruments or other authoritative documents, there are now provided enhanced code symbols and elements in addition to the public key based digital signature which can now more properly authenticate the data contained in the document and also can verify the authorship of the digital signer of the document. Thus in order to provide additional encoded information for authentication which would permit the detection of any alteration of the payee's name or the amount involved in the document, the data which is signed is to be made available in machine readable form either from the MICR code line or else contained in a bar code symbol along with its digital signature itself. A laser printer is useful here in printing a two-dimensional (2-D) bar code that can easily contain upwards of up to 360 8-bit ASCII characters per square inch of label.

Also as part of the system, it is capable of utilizing a code with a moderate amount of in-built error correction that will allow for error recovery and data integrity. Here it is possible to use a security level 2 that provides for recovery from up to 6 unreadable or missed-coded code-words within the 2-D symbol. This level of data integrity is easily feasible without adding significant overhead to the bar code.

The present invention provides an organization of data that is contained in the laser printed 2-D symbol that includes the type and version number, a mandatory license identification field, a mandatory public key identifier, a mandatory check (or document) digital signing date, a optional numerical amount (such as a check amount), an optional name of the payee, an optional identification ID field, an optional magnetic tag data which includes an estimate of the track speed when the taggant symbol was first read, and a mandatory digital signature whereby each data field is separated from the next data field by a carriage return and line feed code (CR/LF)

BRIEF DESCRIPTION OF THE DRAWINGS

FIG. 8 is a presentation of data from a file designated Intermediate File (data3.int);

FIG. 9 is a drawing showing the content of the digital signature file (data3.sig);

FIG. 10 is a drawing illustrating the data content of the label file (data3.lab) used to generate the 2-D bar code symbol.

Figure 1:
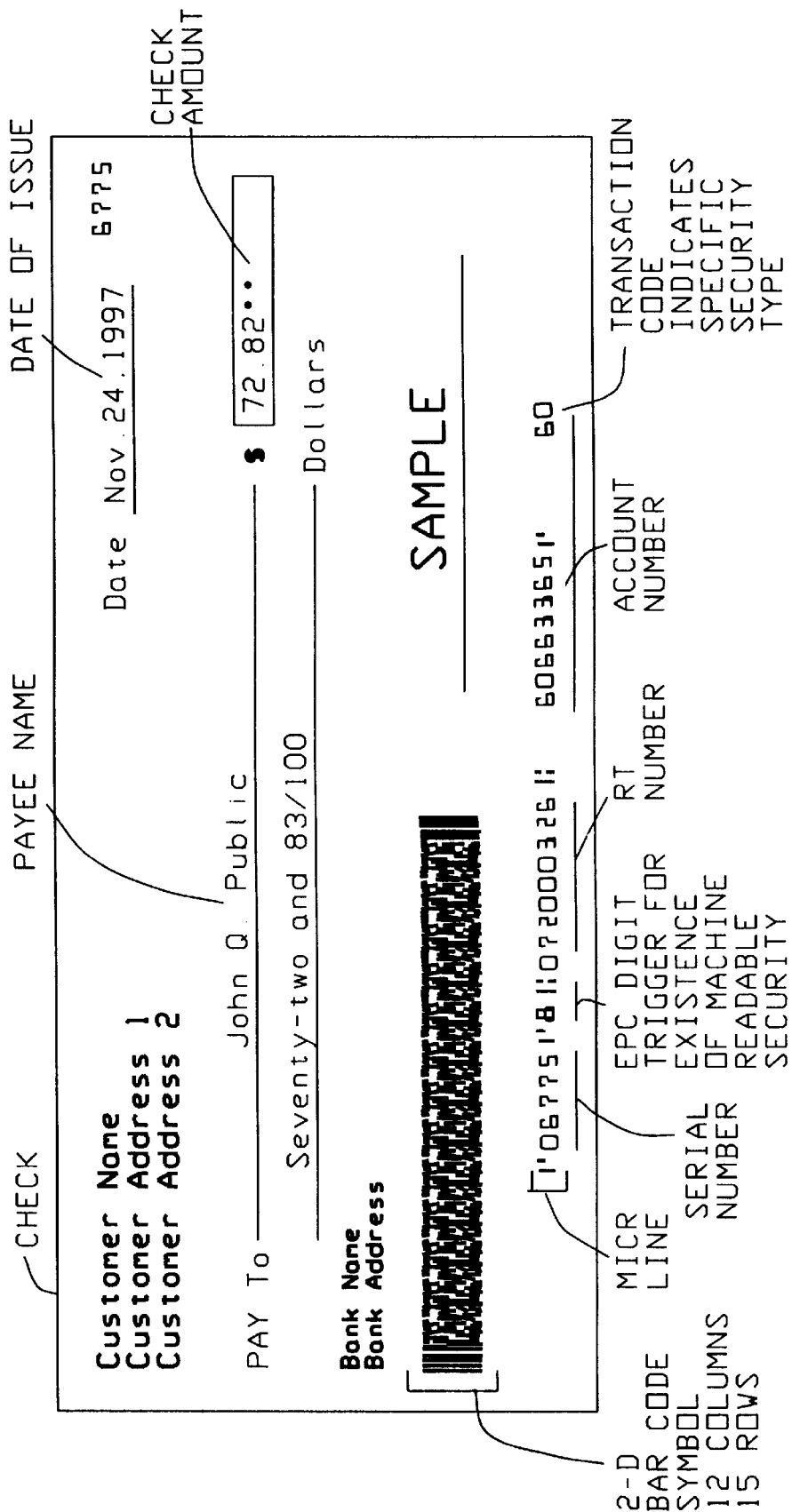
FIG. 1 is a drawing illustrating a typical check that is printed and issued by a computer controlled laser printer.

GLOSSARY OF TERMS 1. 2-D BAR CODE: This is a two-dimensional bar code system as contrasted with the normal one-dimensional bar code system. As a result, this symbol may hold 1,800 characters in an area the size of a postage stamp.
2. BANK OF FIRST DEPOSIT: This would be the bank where a check or other negotiable document is first deposited.
3. BAR CODE DATA: This is printed code used for recognition by a scanner. Normally, one-dimensional bar codes use the bar's width as the code, but encode just an ID or an account number. Two-dimensional systems such as PDF-417 hold 1,800 characters in a area the size of a postage stamp.
4. BMP: This is a Bit Map designation for a Windows Graphics Format that may be device-dependent or independent. Device-independent BMP files (DIB) are coded for translation to a wide variety of displays and printers.
5. CLEAR TEXT DATA FILE: A clear text data file means or refers to readily readable alpha-numeric words and numbers using the ASCII code tables without any special tools or algorithms.
6. CORRELATION FUNCTION: This is a software algorithm which tests one candidate pattern with another reference pattern for its similarity. Mathematically, correlation is concerned with the relationship between two sets of measurements, (say X and Y). Data correlation function is used interchangeably with correlation.
7. CR/LF: This indicates an action designated carriage Return and Line Feed code.
8. DIGITAL SIGNATURE: This is a method of authenticating a particular message or document to verify and detect that the message or document has not been altered and that the only person who signed it is the person who holds the private digital key that is associated with the public key used to perform the authentication.
9. ECC: This represents Elliptic Curve Cryptography which can provide the same level of security with a 40-byte digital signature that is equal to that contained in a RSA 96 byte digital signature.
10. ENCODED INDICES: By the use of 2-D bar code symbols, it is possible that other data, not normally encoded, is included herein to show such items as the payee's name, the check amount and the check issue date. Additionally, there is an option to include data on the magnetic taggant.
11. EPC FIELD: This represents the External Processing Control Field (EPC). Position 44 on a check reserved for a special single digit field called EPC field. A character in this position may impart special information to a processor of a check as it first enters the payment stream.
12. ERROR METRIC: This is a numerical designation which indicates the possible error factor involved when a document reader reads a magnetic taggant.
13. FIXED FORMAT DATA: This is meant to include data in a fixed field length which are mandatory.
14. HASH OR HASHING: As used here, a hash function is a one-way algorithm that works in only one direction. A hash function takes a message of a variable length and converts it to a fixed length, generally a smaller output string called a message digest. There is an item called a Standard Hash Function which involves published hash functions as contained in the ANSI standards or in the Federal Register.
15. INTERMEDIATE FILE: This is a file that exists only temporarily for the purpose of generating the digital signature. The intermediate file is used in signing the document, i.e., laser printing it with the 2-D bar code symbol. The intermediate file is also needed in the process of performing the authentication. Bear in mind it does not have to be stored on a disk memory with a file name. It need only exist in a temporary register or memory location in RAM. Since the MICR line data need not appear in the label data but is used in generating the message that is digitally signed, the intermediate file is needed, at least temporarily.

16. LABEL FILE: This is the name for data contents which is used to print the bar code symbol. The bar code software provides the formatting and error correction coding necessary to be embedded into it. The label file contains 8-bit ASCII text and 8-bit binary data (non-text as in the digital signature) as well.
17. MACHINE READABLE TAGGANT: This is any property of a material that can allow it being uniquely identified or the presence of that material and its specific properties with the use of machinery in an automated environment. Some examples of taggants are radioactive isotopes put into an ink, fluorescent ink, and some holograms stamped or affixed to a document. Machine readability implies that the taggant is affixed or applied in a certain location and that the process of identifying the taggant is capable of being read or authenticated at reasonable speeds.
18. MAGNETIC TAGGANT: This is a marking, done with a substance having magnetic remanence, which can be added to a document or item to impart a special property which can be sensed or detected without destruction. Often this involves a magnetically-loaded printing-ink that can be placed on an object or item.
19. MESSAGE DIGEST: This is the result of a hash function which takes a message of a variable length and converts it to a fixed length to develop a generally smaller output string which is called the message digest.
20. MICR: An acronym that stands for Magnetic Ink Character Recognition.
21. MICR CODE LINE: This involves the bottom ⅝ of an inch high horizontal band on checks which is reserved for the MICR Code Line and MICR printing. The MICR Code Line contains MICR characters.
22. OCR: An acronym that represents Optical Character Recognition. OCR is often used to describe the special characters themselves.
23. On-Us BANK: This is the bank on which the draft or negotiable instrument is drawn and which is the final recipient of the check or instrument.
24. PDF-417: This designates a specific version of Portable Data Format two-dimensional bar code symbol that has been put into the public domain.
25. REMANENCE CHARACTER: A specialized magnetic symbol imprinted that imparts magnetic remanence variation when magnetized.
26. RSA: This denotes an algorithm that involves a private key and a public key. This stands for Ribest-Shamir-Adleman which is a highly secure encryption method that uses a 2-part key. The private key is kept by the owner and the public key is published. RSA is often used for authentication. It is possible to verify who you are with a digital signature by encrypting with your private key and letting others decrypt your message with your public key. This requires the sender to compute a hash value of the message being sent, which is encrypted along with a message. The recipient or receiver decrypts the hash value and computes the hash value from the message using the same algorithm. If they match, the digital signature and the message is authenticated.
27. RT: This is an acronym for Routing and Transit field. The RT field contains the RT or routing and transit number, which is assigned by the ABA (American Bankers Association). The routing number is a unique number which includes the Federal Reserve District number and a unique bank identification number. The RT number is used to allow a collecting bank to send an item to the correct paying institution.
28. SEPARATELY PRINTED MACHINE READABLE CODE LINE: By selecting data from another separately printed machine readable code line, the system will use all the MICR line data fields except the amount field for the purpose of generating an intermediate file and subsequently digitally signing it. The purpose of including this data is to provide a degree of alteration protection for the MICR line. An alteration in any MICR field content will be detected as it is required to be used in the authentication process. When using a laser printer that also prints the MICR line, its contents must be known by the check printing software in order to be printed. If using check stock that has the MICR line pre-printed, the contents also must be known and the serial number synchronized to the software and actual checks for accounting purposes. This requirement has nothing to do with the magnetic taggant data. The inclusion of magnetic taggant data is an option and a separate field exists for storing the tag data.
29. TAGGANT PATTERN: This refers to the analog signal or its phase signal which has been generated by the zero crossing detection of its analog signal. Taggant data is generated by a coding algorithm which codifies the taggant pattern and allows the pattern data to be stored in a compressed data format. The phase information that is generated from zero crossings of the analog taggant pattern is strong enough to uniquely identify the document, the next time that document is presented for authentication.
30. TIFF: This is designated as Tagged Image File Format. This is a widely used raster graphic file format that handles monochrome, gray scale, 8 and 24-bit color.
31. TRANSACTION CODE: A number or symbol in the right-hand portion of the On-Us field that indicates a specific type of security method on a given document.
32. TRANSACTION CODE AREA: This is a fixed location on the On-Us field which is at the extreme right of the On-us field beginning at position 14.

GENERAL OVERVIEW

The following background items and exposition provide a foundation for the better understanding of the methods for self-authentication of documents using encoded indices.

A clear text data file means readily readable alphanumeric words and numbers using the ASCII code tables without any special tools or algorithms. The ASCII code is a standard way for computers to process and store text data in files where 7 or 8 binary bits represent each character. Three or four bits at a time are used to represent each hexadecimal number (a number with the base of 16) and 2 hexadecimal numbers represent each ASCII character or symbol. For example the hexadecimal number for the binary number of (0110) is 6H. In ASCII code, 33H means the number 3 from the standard table and is written in binary as (0011-0011). Most computer software readily reads ASCII characters and can convert them to readable and printable text.

The function of clear text in the 2-D machine readable bar code is to provide a ready machine readable form of the variable data which is usually printed on the check. This variable data is the payee name and address, amount of the check, and the date of issue. Even though it might be considered that information that is typed or machine printed on a check is machine readable, the fact remains that the data type, i.e. whether the field is the payee or the date and the location of the data type, are not standardized on checks and consequently its OCR machine readability is marginal at best. The bar code may also contain error correction capability thus offering additional robustness. If the check uses a taggant character, then its data is also contained in the clear text portion of the bar code format so that that data may be easily used for machine comparison and correlation with the data taken from the physical taggant when the check or other value document is later authenticated. This taggant data is not meant to be readily or directly read and interpreted by a teller.

This clear text data may form the first layer of protection against alteration. When the bar code is read and its clear text presented on a display at the merchant register, for instance, the merchant may visually compare the handwritten or machine alpha-numeric printed data to determine that it's identical. If not, there may have been an alteration. In attempting to reduce fraud it is well known that the best defense is to detect a fraud attempt at the first opportunity that the item enters into the payment system. It is more difficult to recover a loss once a check has been accepted as payment for goods or cashed. In addition, the clear text contained in the bar code is further protected against alteration by an enlightened fraudster by being part of the message that is digitally signed.

BMP graphics file format means a raster format for data that is bit mapped as used in Microsoft Window's applications. This file format is useful to contain an image of a font or picture and the window's application allows the picture to be inserted into a page that contains standard text as an example. Using software that is commercially available, there is used the label file shown in FIG. 10, (data3.lab) to generate a 2-D bar code. The bar code file was saved as a BMP file for importing into a Microsoft Word document that contained the other elements of the check that was to be printed. There are other file formats that are equally useful for integrating the bar code into a check for printing using a laser or ink jet printer.

Figure 3:
FIG. 3 is an illustration of a sample check having a different transaction code that contains a magnetic ink printed taggant MICR symbol (Remanence Symbol)

In another example, FIG. 3, the MICR line illustrates a ⑤⑴ in the right most portion of the On-Us field of the MICR line. To the immediate left of the ⑤⑴ is a special character (■) that is designed to permit magnetic remanence patterns to be read using a single read head for reading both the standard MICR characters/symbols as well as the magnetic remanence character. This character is easily read in modified MICR readers while at the same time provides enough real estate for a sufficiently lengthy magnetic remanence pattern to be captured. This data would be inserted in the bar code label data and consequently appear in the printed bar code just in front of the digital signature portion of the code. For a 96 Byte RSA digital signature, this data would appear just in front of the last 96 bytes of the label data. The data label file, data3.lab, FIG. 10, is for a Type I document containing enhanced positive pay data and does not contain the optional magnetic taggant pattern data. Of course, what is shown is only one file format. Anyone skilled in the art may generate other file formats containing options such as Country codes, currency codes, etc. and reorganize the data using tag names to identify the fixed or variable fields such as done in the popular TIFF (Tagged Image File Format) used as a header for images.

MICR code line and Transaction Codes involve the bottom ⅝-inch high horizontal band on checks that is reserved for the MICR code line and MICR printing. The MICR code line contains MICR characters. These MICR characters allow the check to be processed at high speed in the automated check processing payment system. In the United States, over 99% of the checks are processed without MICR character read-rejects. Each MICR character is printed at a fixed pitch of 8 characters to the inch beginning from the rightmost ¼ inch from the leading edge of the check. The lead edge is the right most edge of the check as its face is viewed. Checks are processed in reader/sorters moving from left to right so that the lead edge is always read first. A 6-inch check, which is the smallest size check in the United States, has room for 45 characters, but only 44 can be safely printed or encoded without running into borders or off the left edge of the check. Position 44 has been reserved for a special single digit field (FIG. 1) called the EPC field for External Processing Control field. A character in this position may impart special information to a processor of a check as it first enters the payment stream. A character ⑼, for instance, indicates that the check is a candidate for image truncation. Recommended is the use of character ⑻ or ⑺ in the EPC field to indicate that this particular document contains a machine readable security feature. The character ⑻ (FIG. 1) could be used when the EPC field indicates the document contains a machine readable security feature. The character ⑺ then could be used when the EPC field would normally contain a character ⑼ and the document also contains a machine readable security feature. The particular type of security feature would then be indicated by pointing to a fixed location in the On-Us field, such as the transaction code area, to the extreme right of the On-Us field, beginning in position 14. As an example, there is shown a transaction code ⑥⓪ and ⑥⑴ on FIGS. 2 and 3, respectively. It is expected that other machine readable security features may be offered by suppliers and there would be a need for multiple security systems to co-exist. The specific numbers used to identify this invention may be determined by a check standards subcommittee or consortium of bankers sometime in the future.

A digital signature uses public key technology and is applied to a specific message. It is a method of authenticating that message to verify and detect that that message has not been altered and that the only person who signed it is the person who holds the private digital key that is associated with the public key used to perform the authentication. Digital signatures provide message integrity and authenticity of the source of a message. Digital signatures also provide for non-repudiation that guarantees that the originator cannot deny having written the check. A certificate authority, a trusted third party that may be a bank, may issue the keys and makes the public key available to anyone who needs it to perform verification.

Fortunately, there have been developed other public key digital signature systems that need much shorter key lengths to maintain the same level of security as the longer key RSA technology. For example, ECC, Elliptic Curve Cryptography, can provide the same level of security with a 40 Byte digital signature that is contained in a RSA 96 Byte digital signature. ECC technology licensed by Certicom makes it feasible to include a digital certificate in the 2-D bar code making the system now autonomously self-authenticating. The public key length for an ECC key is typically 21 bytes, so a digital certificate may be about 70 bytes long. It is reasonable to record up to about 200 bytes in a 2-D bar code on a check. This is apportioned as 70 bytes for the digital certificate, 40 bytes for the digital signature, thus leaving 90 bytes for the message itself. This leaves room to contain more than the examples shown in the label file, data3.lab, of FIG. 10, which contains 63 clear text data bytes. When including magnetic taggant data, approximately 20 or 30 more bytes are required than is shown in the example from data3.lab, FIG. 10, still falling within the total data arbitrary bytes of approximately 200 bytes.

Bar code data is used to produce a bar code pattern often with commercially available software. A data file that includes ASCII character data, as well as binary data may be generated by other software systems which is used by the bar code generating software to generate a BMP or other common graphics file format, which is used by a printer to print a bar code. The system is preferably chosen to use PDF-417, a bar code specification that is in the public domain, but other 2-D bar code types may be used just as well in this invention.

Hash or hashing, as used in this patent application involves a hash function which is a one-way algorithm that works in only one direction: It is easy to compute a hash from a message, but it is hard to generate a message that hashes to a particular value. A hash function takes a message of a variable length and converts it to a fixed length, generally a smaller output string called a message digest. The hash function must be known publicly because, for authentication, it is needed to generate a new message digest from the message contents obtained from the check. In the verification process, both message digests must be identical for a positive verify.

A typical bar code is one dimensional, i.e. it can be read from right to left or left to right as long as each bar is scanned by a wand or scanned electronically from within a image of that bar code. For supermarket applications the bar heights are typically large to provide for reading or scanning with a scan-to bar-code-label path of 45 degrees or more. In applications where omni-directionality of the scanned product is not critical because of document constraints, for example, the bar height may be substantially reduced to reduce the real estate used or to provide room for more encoded data. Reducing the bar height and concatenating modules or groups of bar codes together can permit the use of what are called "stacked codes", i.e. several 1-D bar codes that are stacked, one upon another. These symbols or codes are commonly called 2 dimensional symbols or 2-D bar codes.

Examination of a stacked bar code symbol shows that it is composed of group codes arranged in columns and rows. A standard bar code reader that is capable of reading PDF-417 symbols can usually decode the symbol, if the scanner in a raster scanning format, can read each scan module or group contiguously in a single scan sequence. When encoding data that includes digital signatures, the bar code reader must be able to process binary data in 8 bit bytes. The full symbol is decoded when all the symbol groups have been read and reordered per information provided in the bar code pattern itself.

The bar code generation software allows for changing the nominal width of each code bar/space and the height of the bars. Further flexibility allows the number of columns and rows to be varied to fit a given application. The system is chosen to stretch out the bar code symbol by increasing the number of columns to 24, 28 or 30 in order to reduce the number of rows to code a given data pattern. In so doing, the total height of the symbol is made smaller and the aesthetics of the symbol appears to be improved for placement on checks and similar documents.

Reading of the bar code symbols is facilitated by the decoding of the symbol from the scanned image of the check or like document using a software algorithm that decodes the bar code while the image is stored in DRAM memory just prior to compression and subsequence transmission of the image data. There are a number of 2-D bar code symbols in use today and this invention is not limited to the use of PDF-417.

Regarding Encoded Indices, the encoding of all desired data is done using a 2-D bar code symbol. With this invention, other data from a check or value document not normally encoded in a machine readable format, is included, such as—the payee's name, the check amount and the check issue date. Additionally, the magnetic taggant data is optionally included.

With this invention, the index of this data is now included in a machine readable form that provides benefits to a number of parties who process checks and other similar documents. First the check issuer is producing a more secure check that allows his bank to easily provide positive pay disbursements without the backroom problems associated with normal positive pay systems using a data file of checks issued sent to the bank shortly after the checks were prepared. The person who receives this check will likely have this check more readily accepted if it can be authenticated at the point of acceptance. The merchant or bank that accepts this check and authenticates these items will have fewer losses due to fraud because this invention provides a higher form of security than checks, which are conventionally printed using only visual security features. The processing bank can index or extract the payee name and issue date and provide statements that include virtual checks instead of images of each check.

The system described here promotes image and data exchange between financial institutions since, the taggant data, the bar code decoded data, and the MICR line can be captured at the Bank of First Deposit (BFD) and transmitted to the paying bank (On-Us) for remote verification without the physical paper moving from the bank of first deposit to the paying bank.

Using about 300 bytes of data, the paying bank would have enough information to print a statement using "virtual checks" and perform verification that the amount encoded in the amount field is identical to the amount intended by the issuer, and that other machine readable data, i.e. the MICR line has not been altered. If the magnetic taggant option were used, there would be additional assurances that the check presented or paid was not or was an exact duplicate or copy of an original.

DESCRIPTION OF THE PREFERRED EMBODIMENT

The present system and method will continue to use the public digital signature method as was described in the co-pending application U.S. Ser. No. 08/951,757 in order to authenticate the data contained on the check document and the verification of the authorship or "digital signer" of the check. Now, however, to provide additional information for purposes of authentication that actually permits detection of any alteration of the payees name or numerical amount, the data which is signed is placed so as to be available in a machine readable form either from the MICR code line or else contained in a bar code symbol along with the digital signature itself.

Use is made of a laser printer which is capable of printing a 2-D bar code which can contain upwards to 360,8-bit ASCII characters per square inch of label. Additionally, use can be made of one of the most popular codes which is now in the public domain and which is designated as PDF-417 which code has been tested and used in the development of, and feasible proof of, the present system and method. It should be noted, however, that there are other stacked codes which would work equally as well. It is preferred to utilize a code with a moderate amount of in-built error correction in order to allow for error recovery and data integrity. The present system and method uses a security level 2 which provides for recovery for up to six unreadable or six mis-decoded code-words within the 2-D symbol. This level of data integrity appeared to work very reasonably well without adding any significant overhead to the bar code.

The present invention provides for an organization of data which is contained in the laser printed 2-D symbol. These will include the following:

TABLE I

TYPICAL HEXADECIMAL CODING OF DATA USED FOR A TYPE I SECURITY FEATURE

| 1010 | 556E | 6973 | 7973 | 0101 | 2020 | 3630 | 3636 | 3333 | 3635 | 0D0A | 3131 | 2F32 |
|------|------|------|------|------|------|------|------|------|------|------|------|------|
| 342F | 3139 | 3937 | 0D0A | 3030 | 3030 | 3030 | 3732 | 3833 | 0D0A | 4A6F | 686E | 2051 |
| 2E20 | 5075 | 626C | 6963 | 0D0A | 4330 | 3637 | 3735 | 4338 | 4130 | 3732 | 3030 | 3033 |
| 3236 | 4136 | 3036 | 3633 | 3336 | 3543 | 3630 | 0D0A |      |      |      |      |      | a1) 2 bytes for a mandatory type and version number. The hexadecimal type and the version number will identify which methods, algorithms and storage allocations are used in the authentication process. New version numbers can then be associated with updated methods and algorithms. The first 8 bits of this 2-byte data field will indicate the type of document to be processed, allowing for up to 256 distinct types. The last 8 bits will allow for 256 distinct version numbers.

a2) 8 bytes for a mandatory license identification field. This 8 byte ASCII field is required to be filled by the printer of these documents by using their license ID number.

a3) 8 bytes for mandatory public key identifier field. This 8 byte hexadecimal field is for a serial number which links to a certified public key which is used to authenticate the check information.

a4) 10 bytes for mandatory check digital signing date, using ASCII decimal numeric field which contains the month, day and year data—MM/DD/YYYY.

a5) 10 bytes for an optional check amount, using ASCII decimal numeric field which contains the ten digit amount of the check.

a6) 20 bytes maximum for the optional payee name. This involves an ASCII alphanumeric field which contains the payee's name.

a7) 40 bytes maximum for an optional ID field. This field contains the driver's license number or other identification ID numbers for up to three joint account holders.

a8) 40 bytes maximum, if used, for optional magnetic tag data. Each byte of taggant data represent a time interval (6 bits) and a 2-bit sign. The first two bytes of this optional field will contain the estimate of the track speed when the taggant symbol was first read.

a9) 96 bytes (FIG. 9) for mandatory digital signature. This involves a binary field which contains the digital signature of all the above data fields (a1–a8) plus the data from the check documents MICR line reading from left to write, including all symbols and digits. All spaces here are suppressed and the Routing field symbol is represented by A while the ON-US field symbol is represented by C, and the dashed symbol is represented by D. Here the amount field is not used to perform the digital signature.

Each data field is separated from the next by a carriage return and line feed code CR/LF (shown as a hexadecimal 0D0A in Table I and FIG. 10), with the exception of the type and the version number field and the license identification field.

Previously there was a mention (in Background of the Invention) regarding two different types of security documents—a Type I and a Type II. Regarding Type I, there is shown hereinunder a typical table of data in hexadecimal representation for a Type I security document as indicated below in Table I. This shows a typical hexadecimal coding of data used for a Type I security feature. The carriage return/line feed code is seen in Table I as hexadecimal 0D0A, in the last line.

There are a number of types of security documents that are feasibly useful in these authentication situations and the features of these various types are indicated hereinbelow:

TYPE I SECURITY DOCUMENT: This is an enhanced positive placed system used for corporate disbursement and payroll. The payee, the date and the amount are known at the time that the check is printed. The Type I security document includes the optional fields of check amount and payee name, as indicated in FIG. 1 at the specified locations. The optional magnetic taggant data field is not used. There is an indication that this document contains a machine readable security feature by the presence of a MICR character in position 44 of a MICR code line. As seen in FIG. 1 of this case, the digit ꓷ is shown.

Additionally, a character called ᒐ◻ (or another special character/symbol(s) in the firstmost right-hand position of the On-Us field which is shown by the arrow and often called the transaction code or tran-code used to indicate a specific type of security system.

TYPE II SECURITY DOCUMENT: This is the same as the Type I document with the exception that there is an added feature in the 2-D bar code which now contains a magnetic taggant data field and also the transaction code in the MICR line which contains a special/symbol ▬ which is read in order to extract the magnetic taggant data. The example in FIG. 3 shows arrows pointing to these particular data fields.

TYPE III SECURITY DOCUMENT: The Type III security document is used for personal checks where they are pre-signed before they are issued or written. The optional check amount field and the payee fields are absent. The date field contains the date that the check was digitally signed. In addition, there is present an ID field which contains a 40 byte maximum field which contains the driver's license numbers or other ID numbers for up to three joint account owners. The MICR code line contains a character/symbol in the EPC field also known as position 44 and a special character/symbol in the transaction code position of the On-Us field.

TYPE IV SECURITY DOCUMENT: This type is the same as Type III, except that this type of security system now contains the optional magnetic taggant data fields and the special transaction code character/symbol in the MICR code line which is read to extract the magnetic taggant data.

The above example of security documents have been illustrated in terms of check documents, however, there are many other code types which could be provided and defined as needed by specific applications such as in preparation of motor vehicle documents, birth certificates, passports, etc.

DIGITAL SIGNING PROCESS WITHOUT MAGNETIC TAGGANT: Check printing software usually interfaces to widely used accounting packages for example such as those provided by the Quicken program developed by Intuit Company. The accounting data such as the payee name, the check amount, and the date is handed into the check print software as ASCII data and is placed on the check as per the locations specified in the check printing software.

The account name, the bank name and the signature may also be placed in specified locations per instructions in the software. Control of the MICR line and the check serial number is also provided within the check printing software. By parsing the required bar code field data, the digital signature is generated using the private key which was issued by a certificate authority to the account holder.

The digital signature is appended to the clear text data file assembled from the other field requirements as per the type of the security features desired. This new file is then encoded using the selected parameters for producing a "graphics bar code file," typically in a BMP graphics file format. This is then placed on the check in accordance with the location selected by the check printing software. When the check is requested to be printed, all the data is placed on the check in a single print pass.

DIGITAL SIGNING PROCESS INCLUDING MAGNETIC TAGGANT: The previous described security Types II and IV include the magnetic taggant data in the clear text portion of the bar code symbol. All of the clear text plus the data from the MICR code line is then used to create the digital signature that is then appended to the bar code data. It is expected that in order to print the checks in one pass through, the special transaction code character/symbols, (usually in the MICR code line position 14 and higher) are printed using the letter press or lithographic process, and must be pre-printed on the blank check stock as part of its printing process. As each document page is fed into the laser printer, a custom designed page feeder module performs the reading of the magnetic remanence as per methods previously known for reading such material.

AUTHENTICATION PROCESS WITHOUT MAGNETIC TAGGANT OPTION: Documents may be authenticated by reading the MICR characters in E-13B or other code line data in some other font such as CMC-7 or in OCR and the 2-D bar code, which is read with an appropriate scanner which decodes this symbology. Alternatively, the document may be imaged and the bar code is decoded directly from the image itself.

The public key belonging to the account holder or the holder of the private key who signed the original document, is accessed, either from a certificate printed or stored on the document itself, or by downloading the public key from the certificate authority. This key is used to compute a message digest which is the hash, using a standard hash algorithm, of all the data which was used originally when the document was first signed. If this message digest matches that which is obtained by applying the public key to the digital signature obtained from the 2-D bar code, then it is known that the message data and the digital signature is now authenticated. This indicates that not one bit in the entire message, which was signed, has been altered, and that it only could have been signed by the holder of the private key.

AUTHENTICATION PROCESS INCLUDING THE MAGNETIC TAGGANT: The inclusion of magnetic taggant data is indicated by identification of the type number, for instance, of Types II and IV. The authentication process can then consider that verification of the magnetic taggant data is optional. In other words when taggant data is incorporated, it is not necessary for it to be checked, especially if the verification reader does not have that particular capability. However, the checking of a magnetic taggant pattern guards against an exact duplication of a validly and digitally signed document being presented as an original.

In the present system and method, it is a feature that the magnetic taggant be printed in the On-Us field of the MICR code line at the extreme right-hand position of that field so that the conventional MICR waveform readers may be easily modified in order to resolve the magnetic remanence of a specific character, and to code the pattern and to perform correlation against the pattern that was captured at the time the document was originally digitally signed. The pattern code is included in clear text in the bar code and is included in data that is digitally signed so that no data could be altered without its being detected.

FIG. 1 illustrates a figure of a typical business check that is printed and issued by a computer controlled laser printer. The payee's name, amount of the check, date of issue, and the complete MICR line are printed at the same time because the laser printer is equipped with magnetic ink toner. This example illustrates a 2-D bar code symbol that is typical of PDF-417 in that the symbol is printed with 12 columns, 15 rows. The height of the code is dependent then on the number of characters. These check examples have used the data file (data3.lab) (FIG. 10) to produce the bar code symbol. The data file does not format the bar code into various columns and rows. That is usually done in the bar code encoder software by choosing the parameters of number of rows or columns, element width, element height, and the degree of error correction.

Figure 2:
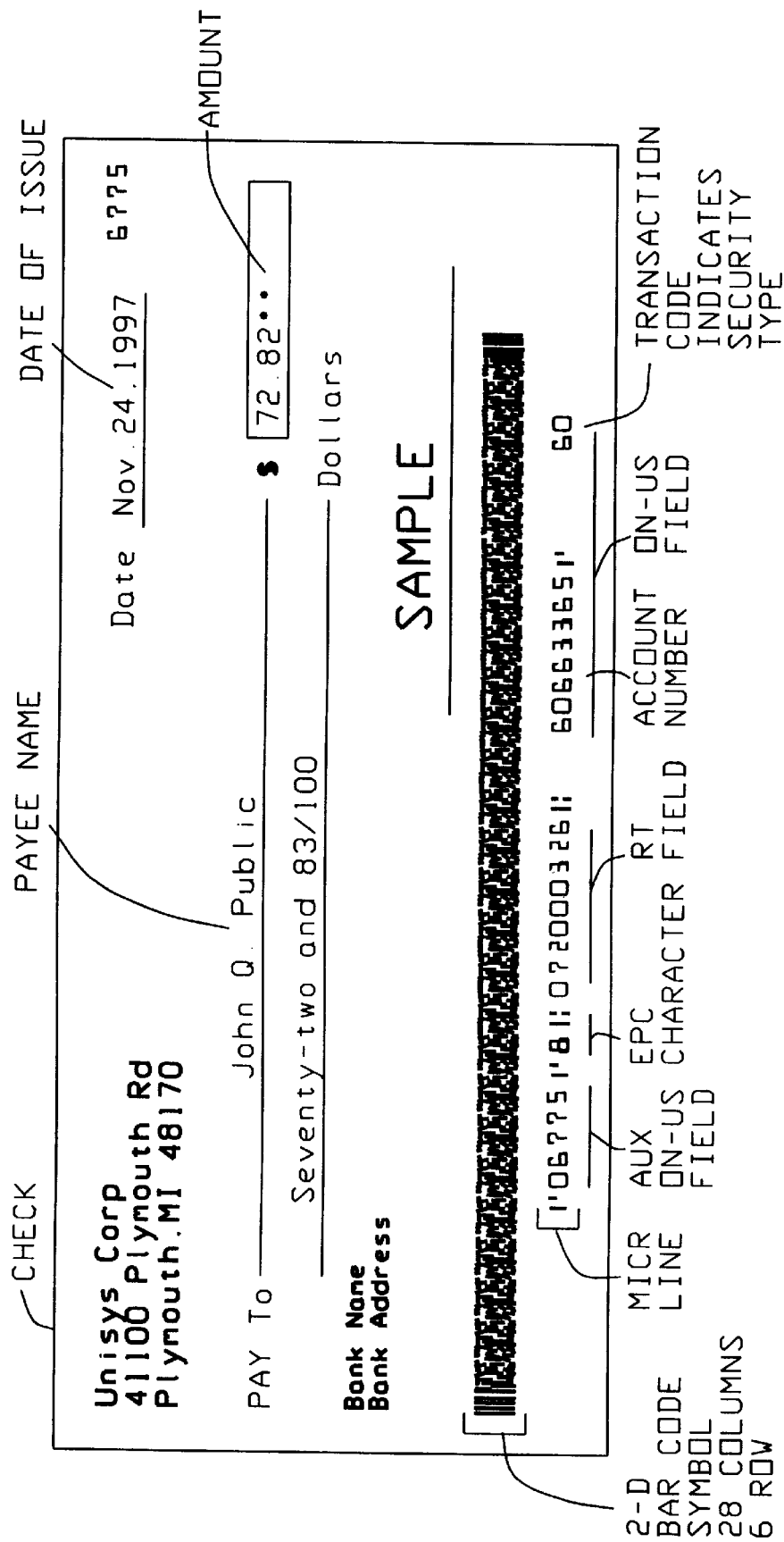
FIG. 2 is a drawing illustrating a sample check document showing the 2-D bar code symbol elongated to 28 columns.

FIG. 1 also shows a typical MICR line with the Aux-on-us field at the left, FIG. 2, separated on each side by the On-us symbols. The Aux-on-us field, FIG. 2, usually contains the check serial number. Between the Aux-on-us field, FIGS. 1, 2, and the RT field is the External Processing Code (EPC) field used to provide (to an external check processor) optional processing information. In this example, there is used a digit ⑧ to indicate that one should look to the Transaction code (Tran code) area of the On-us field for more information. To the right of the EPC field is the Routing and Transit (RT) field that includes the American Bankers Association (ABA) assigned bank number of the issuing bank. Next, is the On-us field that usually contains the customer account number and serial number on personal checks or just the account number for business checks. To the extreme right of the on-us field is the Tran code, if used. These Tran codes usually provide special information to the paying (On-us) bank and have meaning only for it. What is proposed is that banks, through the Check Standards subcommittee, or through a banking Consortium, provide uniform meaning to the Tran codes so that the entire industry may benefit by uniformly identifying machine readable security features. In these ways merchants, other banks, and the paying banks themselves can benefit from a reduction in check fraud due to counterfeiting and check alteration.

FIG. 2 shows a check example which uses the same information as FIG. 1 to print the check except that the 2-D bar code symbol is elongated to 28 columns thereby reducing the number of rows to 6 rows and consequently reducing the overall height of the symbol.

FIG. 3 involves a check example which illustrates a different Tran code than FIGS. 1 and 2 because the check in FIG. 3 contains a magnetic ink printed taggant MICR symbol called the Remanence Symbol. This symbol is to be positioned adjacent to the Tran code in the bank's On-us field because the contents and format of the On-us field are controlled by the paying bank.

Figure 4:
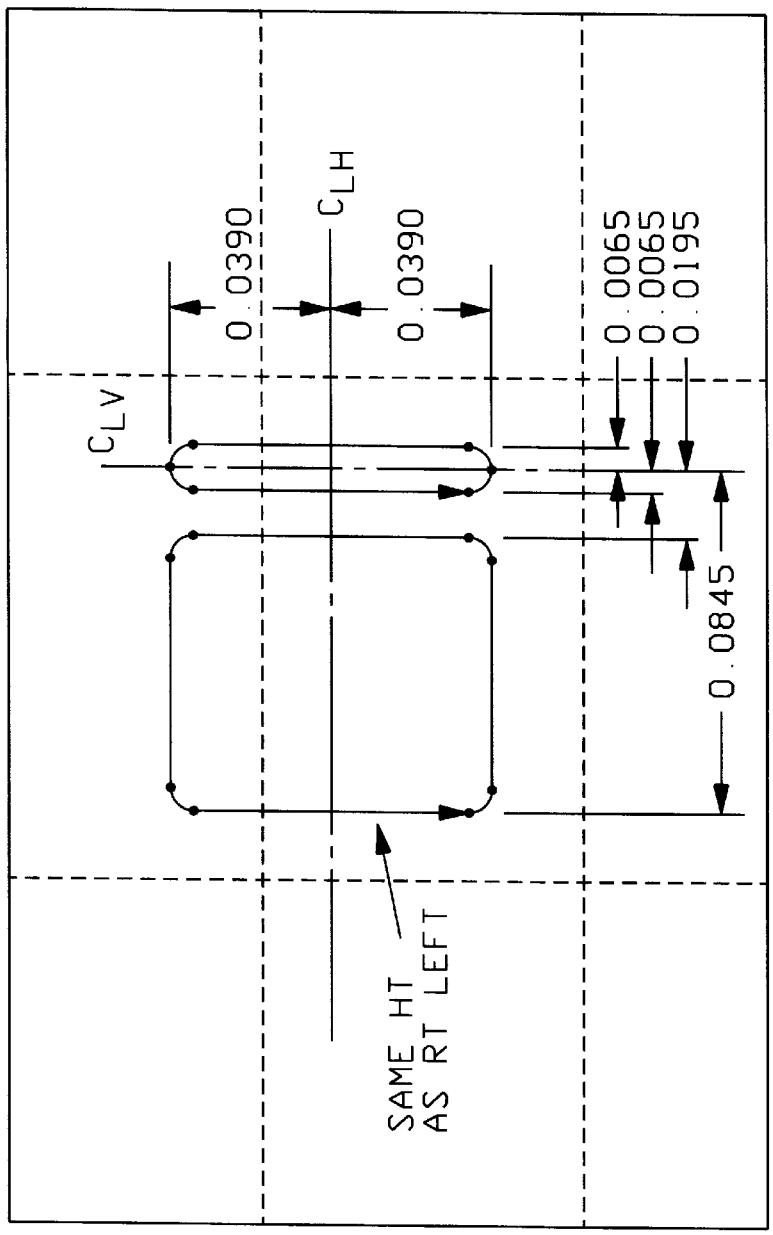
FIG. 4 is a drawing illustrating the preferred dimensions of the MICR Remanence Symbol.

FIG. 4 is a figure that provides the recommended dimensions of a MICR Remanence symbol that is preferred in this invention. Other existing MICR characters or symbols may be used to provide a remanence pattern, for instance the character ⌑, character ⑃, or the ⁞ (RT symbol). However, these other characters do not provide the durable capability for repeatable reading in the presence of document skew because the long horizontal stroke portion of those characters/symbols are split between ink at the top of the character and ink that is below the character's horizontal centerline. When reading in the presence of document skew, the magnetic remanence pattern from the top ink stroke may move in and out of phase with the bottom ink stroke when the document is presented to the MICR read head differently. This effect is minimized by having the total ink stroke compacted in a single stroke.

As seen in FIG. 4, there are shown the suggested optimal dimensions of the remanence character. The horizontal centerline through the character is designated $C_{LH}$. The remanence character symbols are seen to rise a distance of 0.039 inch above the centerline and 0.039 inch below the centerline. The vertical centerline which is designated $C_{LH}$ separates the smaller of the marks while the distance from the left most portion of the large mark to the centerline of the small mark is seen to be 0.0845 inch. Other recommended and optimal dimensions are shown in the drawing of FIG. 4.

Figure 5:
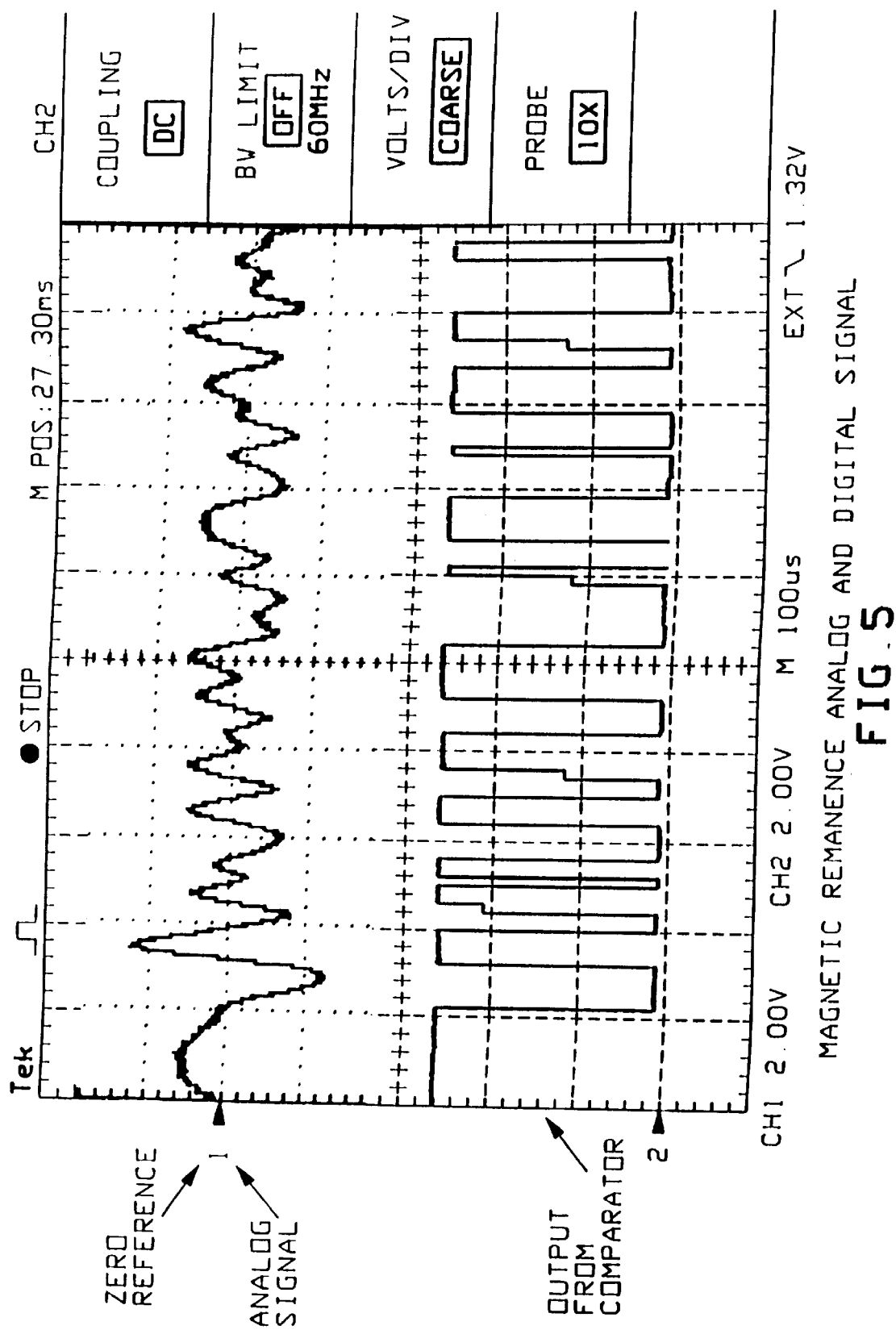
FIG. 5 is an illustration of an analog processed waveform from a portion of a remanence pattern.

Referring to FIG. 5, it is seen that the upper portion of FIG. 5 (from channel 1 of the digital oscilloscope) is the analog processed waveform from a portion of a remanence pattern which was processed from an amplified read head signal which was bandlimited by the MICR read head gap, which is typically 0.0010 inch, and high pass filtered to limit the low frequencies. The resultant pattern data is contained within a 10:1 frequency range corresponding to spatial frequencies within the range of 0.0010 inch to 0.0100 inch on the document. The combination of spatial and electronic filtering forces the remanence pattern to form above and below the zero reference level because of the removal of dc and low frequencies. As a result, phase information can be captured by the use of a digital comparator as shown by channel 2 of the digital oscilloscope. By measuring the duration of the waveform above and below the zero reference value via a count of a high frequency clock, a coded pattern can be processed in the digital domain. Typically the count pattern preferably takes the form of hexadecimal numbers from 000H to FFFH. The count data alternates from count of time samples above zero to count of time samples below zero, etc. until approximately 20 to 30 transitions are detected. The time duration of the long part of the remanence symbol is measured and divided by the sampling clock period to yield a dimensionless scale factor number for estimating document velocity when later authenticating the check or other value document in another and different transport system. This method has been shown in the co-pending U.S. Ser. No. 08/951,757.

Figure 6:
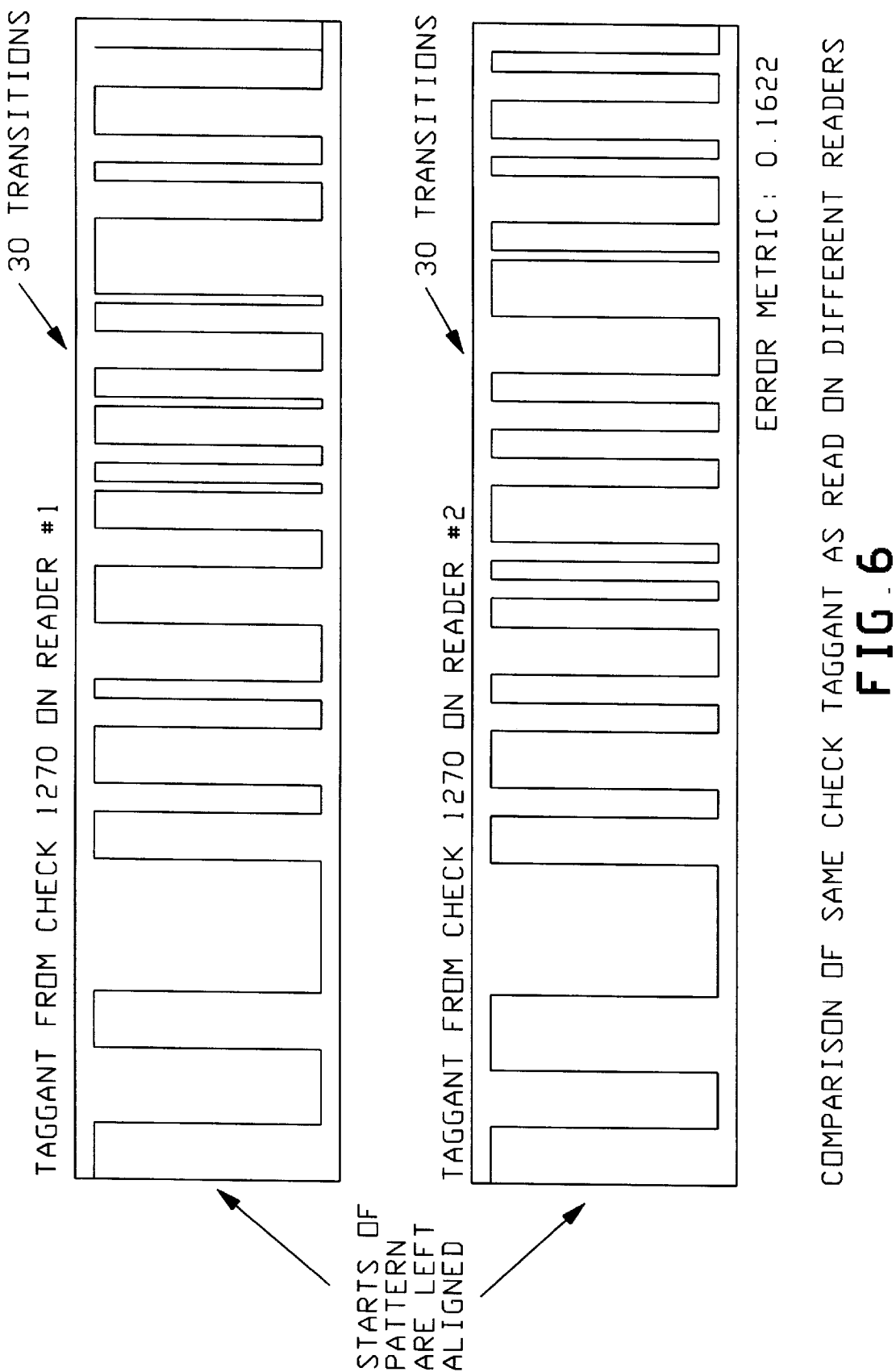
FIG. 6 is an illustration of the same magnetic taggant pattern being read from different transport systems.

FIG. 6 illustrates the magnetic taggant patterns from the same document as read in two different reader transport systems that one would encounter in real operational situations. Differences shown, especially in the higher frequency portions of the waveform are likely due to MICR read head presentment, document skew and MICR read head alignment characteristics and alignment. The correlation algorithm had returned an error metric of 0.1622 out of a maximum of 0.3950 for completely random patterns with the starting position of pattern aligned. When the same document is read in the same reader, typically the error metric is 0.0600.

Figure 7:
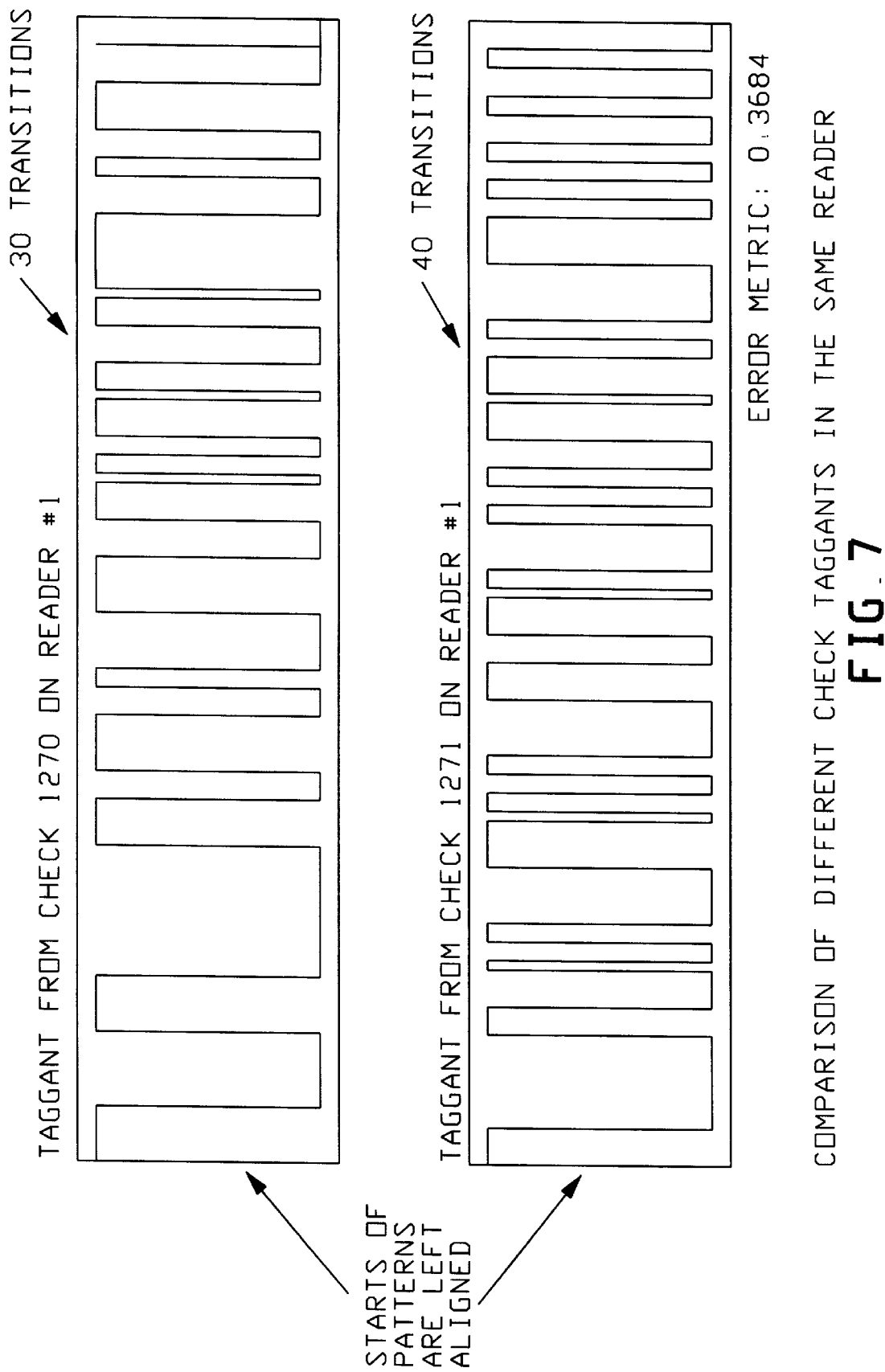
FIG. 7 is a drawing illustrating two typical magnetic remanence patterns to show the error metric.

FIG. 7 illustrates two typical magnetic remanence patterns on the same reader where the error metric yields 0.3684, very close to the maximum value for completely random patterns with aligned starts. The threshold for metric acceptance is set at 0.2500 to allow for differences in read heads, document presentment, and skew. To match the total time counts, the number of transitions in the patterns are different. In an attempt to got a pattern match, one waveform is linearly stretched or shrunk a limited amount and then compared to a reference waveform point by point and the differences squared. Each pattern makes a transition between the values of 0 and 1. Finally, the squared differences are summed and then normalized to adjust for the number of samples. At each step of the stretch or shrink process, the error metric is calculated in an attempt to find the lowest error metric or best correlation.

FIG. 8. FIG. 8 presents the data content from the intermediate file (data3.int). This data file includes the fixed format data, personalized data, and MICR line data for all fields except the Amount field, even if present. The right section of the figure shows the printable data when the data is printable using the standard ASCII character tables. The center section of the figure presents the data in hexadecimal code, which is an easy way of reading binary data, which is the true content of any data file. The left section of the figure lists the hexadecimal Byte number of the beginning entry on each line. The format of the data in the figure is 16 bytes of data per row. If the examples had included a magnetic tag pattern, the message to be signed would be larger by approximately 40 bytes.

FIG. 9 shows the content of the digital signature file (named data3.sig). This file contains only binary data that is unintelligible to humans. The RSA algorithm that was used to perform the digital signature yields a signature containing 96 bytes no matter how long the message that is signed because the message is hashed to a fixed length using the MD-5 hash function. The file that is signed in this example is data3.int (FIG. 8) resulting in the data3.sig file (FIG. 9).

FIG. 10 illustrates the data content of the data3.lab file, (label file) which is used to generate the 2-D bar code symbol. Examination of its content shows the beginning 62 bytes (3EH) are the same as contained in the data3.int file (FIG. 8). The MICR line is not encoded in the bar code symbol but is included in the data that is digitally signed. The last 96 bytes (60H) are the digital signature itself.

Described herein has been a system and method for authenticating data contained on value documents. The system and method provides enhanced code symbols and elements in addition to the public digital signature so that greater ability to authenticate the data in the document is provided and also means to verify the authorship of the digital signer of the document. The enhanced code symbols are made available in machine readable form, either from the MICR codeline or else in a bar code symbol presented along with its digital signature. The present system provides an organization of data contained in a laser printed 2-D symbol that includes multiple assemblages of information allowing for authentication and verification while additionally providing a taggant symbol that enables compensation for any difference in track speeds occurring in different document readers.

It should be understood that the preferred embodiments described herein are only exemplary and that the invention is capable of many modifications and variations in construction arrangement and use without departing from the spirit of the claims. Thus the presented examples of the present invention are merely illustrative and the present invention should be considered as including all possible modifications and variations coming within the scope of the invention as defined by the claims appended hereto.

What is claimed is:

1. In an imprinted valuable document having encoded symbols readable by a document reader, a method for enabling subsequent authenticating and verifying non-alteration of said document via a document reader, comprising the steps of:
   (a) imprinting a two-dimensional bar code on said document which includes an assemblage data group of information which, when read by a document reader, will automatically authenticate the source of the document and verify its original data as standing without alteration;
   (b) utilizing a hash function for creating a message digest which is then signed utilizing a private key from a 2-key digital signature system;
   (c) incorporating a digital signature which can be verified by using a public key and known hashing algorithm when the said document is passed through a document reader.

2. The method of claim 1 wherein step (a) includes the step of:
   (a1) encoding data in said assemblage data group which includes:
      (i) the type and version number of each of said documents;
      (ii) a personal identification field of the originator of each of said documents;
      (iii) public key identification for use by the recipient of each of said documents;
      (iv) the date of said document.

3. The method of claim 2 wherein step (a1) includes the step of:
   (a1a) encoding said data in said assemblage data group which includes:
      (v) a digital signature.

4. The method of claim 2 which further includes the step of:
   (b) encoding data in said assemblage data group which includes:
      (vi) a numerical amount involved in each of said documents;
      (vii) the name of the payee or recipient of each of said documents;
      (viii) an identification (ID) field for each one of said documents.

5. The method of claim 1 which includes:
   (d) imprinting a machine readable code line containing document information on said valuable document.

6. The method of claim 5 which includes the step of:
   (e) imprinting a magnetic ink taggant as a character symbol in the machine readable code line on said valuable document to provide magnetic tag pattern data;
   (f) encoding data in said assemblage data group which includes magnetic ink tag pattern data that provides estimates representative of the track speed when said magnetic ink taggant was first read.

7. The method of claim 6 which includes the step of:
   (i) imprinting a magnetic taggant as a MICR character or symbol to limit its characteristics such that the height of any horizontal stroke in the character or symbol exceeds or equals a nominal value of 0.026 inches, while the horizontal length of that stroke nominally equals or exceeds 0.039 inches.

8. The method of claim 1 which includes the step of:
   (d) imprinting a magnetic ink taggant as a character or symbol in the machine readable code line of said valued document.

9. A method of digitally signing and imprinting digitally coded symbols on a check or other valued document having imprinted bar code data and a machine readable code line, comprising the steps of:
   (a) inserting fixed format data into said bar code data on said document which fixed format data pertains to a significant portion of an assemblage data group;
   (b) selecting personalized text data from the said document for inclusion into said bar code data so as to be coded in a readily determinable computer readable code;
   (c) generating an intermediate record which includes said fixed format data, said computer readable data, and selected data from another separately printed machine readable code line, said intermediate record hashed with a hash function thus creating a message digest;
   (d) generating a digital signature using a private key of a public key digital signature system using said intermediate record;
   (e) generating label record data which includes said fixed format data, said personalized text data, and said digital signature of said intermediate record;
   (f) printing, on said document, of a two dimensional machine readable bar code symbol using the said label record data.

10. The method of claim 9 wherein step (a) includes the steps of:
    (a1) inserting in said assemblage data group information on document type, licensing name, and public key identification number;
    (a2) imprinting a machine readable codeline of document identification data on said valuable document.

11. The method of claim 10 wherein step (a2) includes the steps of:
    (a2a) inserting a machine readable magnetic taggant as a mark in said machine readable code line;
    (a2b) including in said personalized data, the tag pattern data obtained from said machine readable magnetic taggant.

12. The method of claim 10 wherein step (a) includes the step of:
    (a3) inserting, into said assemblage data group, information on currency code.

13. The method of claim 12 wherein step (a) includes the step of:
    (a4) inserting into said assemblage data group, information on country code.

14. The method of claim 9 wherein step (b) includes the step of:
    (b1) including in said personalized data for personal identification information, driver license number, biometric data (fingerprint or iris scan patterns for each account holder) which data has been derived from sources other than the document itself.

15. A method of enabling the authentication, at the site of the user, a check or other valuable document having a pre-printed bar code with a digital signature, and personalized printed data, comprising the steps of:
   (a) reading the bar code on the document, said bar code holding a digital signature;
   (b) reading at least one other separate machine readable area of code line data from said valuable document;
   (c) capturing and storing the data from the bar code together with at least said one other separate machine readable code line;
   (d) validating the authentication of said check or valuable document based on using a public key to verify the digital signature and the data which was originally signed using a private key;
   (e) validating the authentication of said check or valuable document based on a match of said personalized printed data with data extracted from reading the bar code by a document reader.

16. The authentication enabling method of claim 15 which includes the step of:
   (f) comparing, visually, personalized data from said bar code with the printed data on the check or other valued document, said personalized data including personal items of recipient's name, and numerical amount on said valuable document.

17. The authentication enabling method of claim 15, wherein step (b) includes the step of:
   (b1) using a visual or automated comparison of a driver's license or personal bio-metric sensed data.

18. The authentication enabling method of claim 15 wherein step (e) includes the step of:
   (i) utilizing visual or automated comparison means by visual observation of a driver's license or other biometric sensed data (height, weight, hair color, etc.).

19. The authentication method of claim 15 which includes the steps of:
   (o) attaching a magnetic taggant on said check or valuable document;
   (i) reading said magnetic taggant from said check or valuable document;
   (ii) processing said magnetic taggant to produce a taggant pattern holding taggant data;
   (iii) reading said taggant data from said personalized area of said bar code;
   (iv) comparing said taggant pattern with the taggant data from said personalized data obtained from reading said pre-printed barcode using a data correlation function algorithm;
   (v) further validating the authenticity of said check or document using said correlation algorithm indicating that the check or other valued document is authentic based on correlation of said taggant pattern with said taggant data from said personalized data.

20. The authentication enabling method of claim 15 which includes the steps of:
   (f) generating an intermediate record that includes fixed format data from the read bar code, together with said personalized printed data, and selected data from said at least one other separate machine readable code line;
   (g) using the digital signature read from said bar code, and accessing a public key record and utilizing the public key to perform authentication of the data from said intermediate record which has been generated by an on-site document reader.

21. The method of claim 20 which includes the steps of:
   (o) imprinting a magnetic taggant to said check or valuable document;
   (i) reading said magnetic taggant from said valuable document;
   (ii) processing said taggant to produce a taggant pattern;
   (iii) reading taggant data from the personalized data portion of said bar code;
   (iv) utilizing a data correlation function to compare said taggant pattern with said taggant data from the personalized data obtained from reading a pre-printed bar code;
   (v) further validating the authenticity of the document from said correlation algorithm indicating that the check or other valued document is authentically based on a successful taggant pattern correlation.

22. A system for imprinting a valuable document with encoded two-dimensional bar code for enabling authentication of the document's originator and to ensure that no fraudulent alteration has occurred, comprising:
   (a) means to imprint a two-dimensional (2-D) bar code utilizing a series of mandatory assemblage data which uniquely and specifically specify and differentiate each one of said valuable documents, said imprint being readable by a two-dimensional bar code reader;
   (b) said assemblage data including a signed message M which is signed by a digital signature "s" with appendix, and including:
      (b1) means to generate a message digest "h" of said message "M" by application of a cryptographic hash function;
      (b2) means to apply a private signing key "x" of a public/private digital signature system to sign said message digest "h";
      (b3) means to develop a digital signature "s" of the message "M" by utilizing a private signing key "x" so that the signature "s" equals Sx "h", where Sx is the signing function using the private key applied to the message digest "h", thus to form a digital signature.

23. The system of claim 22 wherein said mandatory assemblage data include:
   (a) the type and version number of each of said documents;
   (b) a personal identification field of the originator of each of said documents;
   (c) public key identification for use by the recipient of each of said documents;
   (d) the date of said document.

24. The system of claim 23 which further provides optional assemblage data which include:
   (a) a numerical amount involved in each of said documents;
   (b) the name of the payee or recipient of each of said documents;
   (c) an identification (ID) field for each one of said documents;
   (d) magnetic taggant pattern data that provides an estimate representative of the track speed when said magnetic taggant pattern data was first read.

25. The system of claim 22 wherein said mandatory assemblage data further include:
   (e) said digital signature applied to each of said documents.

26. The system of claim 22 which includes:
(c) means for verifying said digitally signed message "M,s", said verifying means including;
  (c1) means for accessing the public key "y" of the public/private key digital signature system;
  (c2) means for computing the hashed message digest "h" for the message "M";
  (c3) means for utilizing a publicly known verification algorithm to the message digest "h" and to the signature "s" (equal Sx h);
  (c4) means to check that the verification algorithm is positive (true) thereby verifying that the signature "s" is properly accurate.

27. The system of claim 26 which includes:
(d) imprinted magnetic taggant means on said valuable document for providing an estimate representative of the track speed when said magnetic taggant means was first read.

* * * * *